Patented Feb. 25, 1930

1,748,787

UNITED STATES PATENT OFFICE

HARRY S. MORK, OF BROOKLINE, MASSACHUSETTS, ASSIGNOR TO THE DELAWARE, LACKAWANNA & WESTERN COAL CO., OF NEW YORK, N. Y., A CORPORATION OF NEW JERSEY

METHOD OF IDENTIFYING FUEL AND PRODUCT THEREOF

No Drawing. Application filed January 17, 1928. Serial No. 247,463.

This invention relates to the preparation of solid carbonaceous fuels such as anthracite and bituminous coals and coke for market, and particularly to the application of color to such fuels so that it may have a distinctive appearance.

Coals and coke vary widely in quality, depending upon their source, and much inferior fuel of this character is marketed. The quality of such fuels cannot be distinguished by appearance and the prices of fuels of the same kind are generally uniform. Ordinarily consumers are obliged, therefore, to rely upon the honesty of dealers. The latter sometimes sell low grade fuels as the products of producers with established reputations for quality with the result that both producer and consumer are subjected to loss.

It is the object of the present invention to provide a simple, inexpensive and effective method of coloring solid fuels, thereby permitting the producer to distinguish and the consumer to recognize a fuel of superior quality.

Another object of the invention is to reduce the amount of the expensive coloring materials employed to a minimum so that the cost to the consumer need not be increased materially.

Other objects and advantages of the invention will be apparent as it is better understood by reference to the following specification in which the preferred embodiments are described.

The invention depends upon the use of insoluble carriers for the color and the application of such carriers to the surface of the fuel. Thus, it is possible to extend or disperse the coloring material or dye in a suitable carrier. A given quantity of the coloring material may consequently color a much greater bulk of fuel than could be colored by the direct application of the coloring material.

In practicing the invention I prefer to employ silicious carriers which are capable of adsorbing dyes and similar coloring materials. Thus, fuller's earth, china clay and even colored clays such as ochres will adsorb basic dyes from aqueous solutions thereof. Such carriers are colored by the dye and the colors are substantially fast, that is, the colors cannot be removed to any considerable extent by washing. The colored carriers can be applied to fuel in various ways to give the latter a distinctive appearance which serves to identify it in trade.

The basic dyes which I prefer to use are those usually classified as methylene blue, methyl violet, malachite green, chrysoidine, indoin blue, etc. The basic dyes, as a class, exhibit the capacity of adsorption on clays and the like. Other dyes, such as the Janus colors, have the same property and consequently I may select and use any dye which acts in this manner to provide the bulky carrier.

I may proceed in various ways to prepare and apply the carrier to the fuel. Thus, I may dissolve the selected dye in water and stir in the clay or like material. The dye is adsorbed quickly and the suspension of the colored carrier in water can be sprayed on the fuel. Alternatively the fuel can be transported in a traveling conveyer through such a suspension or the fuel can be immersed therein and then withdrawn. When the surplus water is drained from the fuel a film of the colored carrier will remain on the surface of the fuel and the color will be apparent as a distinguishing characteristic. Instead of using a suspension of the colored carrier in water, I may separate the carrier from the water, dry it and then dust the preferably moistened surface of the fuel with the dry colored carrier. To facilitate adhesion of the carrier, binding agents such as sodium silicate, waste sulphite liquor, dextrine, etc. can be added to the suspension or the fuel can be moistened with water containing such binding agents before the dry carrier is dusted thereon.

Although dyes of different colors may be applied to fuels in the manner described, blue is a most attractive color for the purpose of distinguishing fuels and the following examples indicate the preferred procedure in applying blue dyes thereto.

(a) In 500 lbs. of water dissolve one half pound of brilliant cresyl blue 2 B. When thoroughly dissolved stir into the color solution 100 lbs. of finely pulverized china clay. After a few minutes the dye will be completely adsorbed by the clay and if the colored clay be allowed to settle the water will appear uncolored. The clay can be kept in suspension by agitation and by any suitable means the liquid mixture can be sprayed on the coal. On drying the coal will appear colored a bright blue to a degree depending on the amount of color mixture sprayed on.

(b) In 200 lbs. of water dissolve one half pound indoin blue and one tenth pound of Victoria blue B. Into this dye solution stir 100 lbs. of finely divided fuller's earth. This will form a more or less pasty mixture, which can be fed on the coal as it passes through a spiral conveyer. The agitation of the coal in the conveyer will distribute the color over the surface to a more or less degree depending on the amount of color added and the agitation.

Fuel treated as hereinbefore described presents a distinctive colored appearance and is easily distinguished from ordinary fuel. The producer is thus enabled to identify his product and to provide for the recognition thereof by the consumer. The latter in buying such fuel is assured of the quality of the product and consequently both producer and consumer are protected from unfair practices of dealers.

The foregoing examples of the practice of the invention are merely illustrative. It will be recognized that wide variations in the selection of the carrier and coloring material or dye as well as in the procedure of preparing and applying the carrier are possible. Various changes may be made, therefore, without departing from the invention or sacrificing the advantages thereof.

I claim:—

1. A method of coloring coal, which consists in dissolving a basic dye in water, adding thereto a clay having the capacity for adsorbing the dye from the solution and applying the suspension of the colored clay to coal.

2. A colored solid carbonaceous fuel having a coating consisting of clay with an adsorbed basic dye.

In testimony whereof I affix my signature.

HARRY S. MORK.